Dec. 30, 1941.  G. A. VAUGHN  2,268,175
CONTROL MECHANISM FOR DIRT HAULING VEHICLES
Filed April 14, 1941  2 Sheets-Sheet 1

INVENTOR:
George A. Vaughn
BY
Robb & Robb
ATTORNEYS.

Dec. 30, 1941. G. A. VAUGHN 2,268,175
CONTROL MECHANISM FOR DIRT HAULING VEHICLES
Filed April 14, 1941 2 Sheets-Sheet 2

INVENTOR
George A. Vaughn
BY
Robb & Robb
ATTORNEYS.

Patented Dec. 30, 1941

2,268,175

UNITED STATES PATENT OFFICE 2,268,175

CONTROL MECHANISM FOR DIRT HAULING VEHICLES

George A. Vaughn, Newton, Iowa, assignor to Koehring Company, Milwaukee, Wis.

Application April 14, 1941, Serial No. 388,518

6 Claims. (Cl. 37—129)

The improvements of my present invention appertain to dirt scraping and hauling vehicles primarily of the type wherein a tractor vehicle is used as the pulling means for a dirt carrying vehicle of the so-called trailer type, that is to say, the tractor vehicle is a four wheeled vehicle operated under power of a suitable motor or engine and the dirt receiving and carrying vehicle comprises a vehicle body and rear wheels upon which the body is supported with draft connections intermediate the front end of said dirt carrying vehicle and the rear end of the tractor.

This invention further appertains to the type of such vehicles wherein the body of the trailing dirt carrying vehicle is adapted to be raised from a lowered position for action of a scraper to scrape dirt or material into the body, to a higher or relatively high position from the ground in which the body travels to a place of deposit of the dirt. In this connection the raising and lowering means for the body comprises a cable suitably connected to effect a relative movement of the rear axle and wheels as an assembly unit and the body, this movement being in the nature of an articulation of the body and said rear wheel assembly of the trailing dirt carrying vehicle. The cable means is connected to a series of sheaves properly located at the rear end of the dirt carrying vehicle and leads forward to a windlass or operating means carried on the tractor vehicle readily to be operated by the driver of the latter vehicle.

In the operation of the vehicle means of the type referred to, the operating cable leading from the tractor to the rear portion of the dirt carrying vehicle is tensioned by winding about the drum on the tractor vehicle in order to raise the body from its scraping dirt receiving position to the dirt hauling or carrying position at which the said body is pulled at relatively high speed to the place of deposit of the material in the same. If the body of the dirt carrying vehicle is elevated to its limit of upward movement and the limiting means is rigid, it will be seen that the tendency of the cable means would be to hold the tractor and trailing vehicle units in substantially a fixed line against relative vertical movement. Under these conditions, with the cable under tension, it will be obvious that should the front wheels of the tractor reach a rut or depression in the terrain, the cable means under definite tension would prevent the front wheels from entering or lowering into such rut or depression. Since the front wheels are steering wheels and control the direction of movement of the tractor vehicle, the steering wheels must maintain contact with the ground to afford their steering function.

Again, if in the operation of the vehicle means, the rear and only wheels of the trailing dirt carrying vehicle should enter a depression in the terrain, if the cable means is non-yielding, the effect would be that the heavy vehicle would lift the front steering wheels of the tractor vehicle. The above adverse condition as to the steering wheels may take place when the tension on the cable is non-yielding as an incident to the raising of the rear wheels of the tractor in passing over a mound or hummock in terrain.

My invention provides means to prevent the above difficulty in the operation of combination tractor and dirt carrying vehicles of the type under discussion and the means of the invention comprises the use of certain parts intermediate the axes of the sheave blocks around which the lifting cable is reeved and which sheave blocks are carried by the upper frame of the rear axle assembly of the trailing vehicle and the lower rear portion of the body of the trailing vehicle. The resilient limiting means takes the form of a limiting stop member and a resilient bumper contacting therewith.

The effect of the said resilient limiting means is to enable the cable lifting means to have a certain amount of movement around the sheaves about which the cable is reeved so as to permit the cable by reason of the resiliency of the limiting means to move sufficiently if the front steering wheels of the tractor drop into a depression to permit these wheels to maintain contact with the ground. Or, if the rear wheels of the dirt carrying vehicle drop into a depression enough cable will be paid out to enable the front steering wheels of the tractor to maintain contact with the ground, and likewise, in the event of elevating movement of the rear wheels of the tractor that might otherwise tend to lift the front steering wheels off the ground, the said steering wheels are permitted to maintain traction contact with the surface over which the vehicle means is travelling.

The invention of the resilient limiting means is primarily an emergency feature of the tractor trailing vehicle unit which is brought into play or acts primarily only when the operator elevates the dirt carrying vehicle body to its upper general limit of movement for increased speed traveling to a place of dirt deposit. If such limit of movement is not the adjustment of the body, or in other words, the body is not hoisted sufficiently high to bring the resilient limiting means into play, there is left a certain distance of movement of the body upwardly in the normal travelling of the vehicle means such that the front wheels of the tractor vehicle will usually maintain their normal contact with the terrain over which the vehicle unit is travelling.

The dirt carrying vehicle, construction, tractor, and general operating means, to which my present invention is applied, are the same as set forth in my copending application filed April 13, 1941, under Serial No. 329,531.

Figures 5, 6:
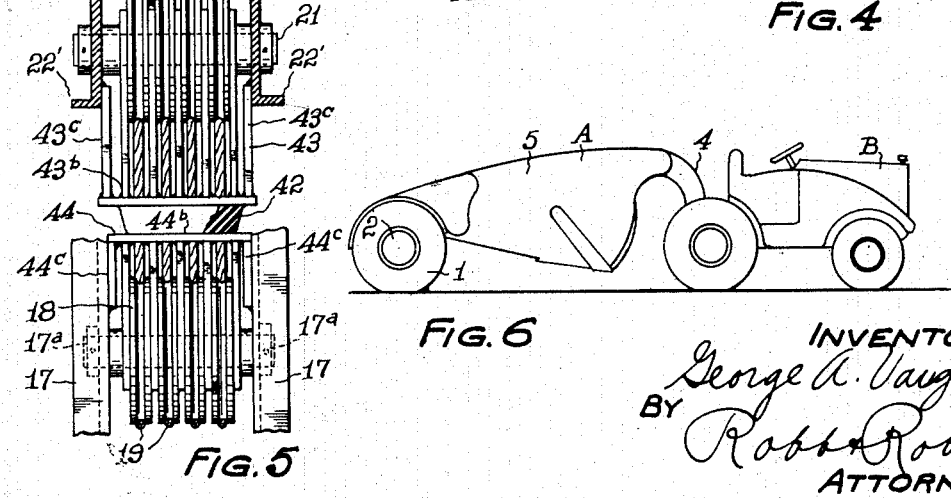
Figure 5 is a detail view bringing out more clearly the limiting stop means per se and arrangement relative to the upper and lower sets of sheaves.
Figure 6 is a diagrammatic side elevational view of a complete tractor trailer dirt hauling unit embodying the invention, indicating primarily the relation of the various wheels of the tractor and trailing vehicle.

Describing the above features so far as needed for this specification, in the drawings, Figure 6 shows the scraper and dirt carrying or hauling vehicle A propelled by a tractor B and operating as a trailer, comprising rear wheels 1, axle 2, and universal joint or draft connection 3, the latter suitably attached to the front draw bar 4 of the vehicle A. The draw bar 4 supports the front of the dirt carrying vehicle A which comprises a body including sides 5 in spaced relation.

Figure 2:
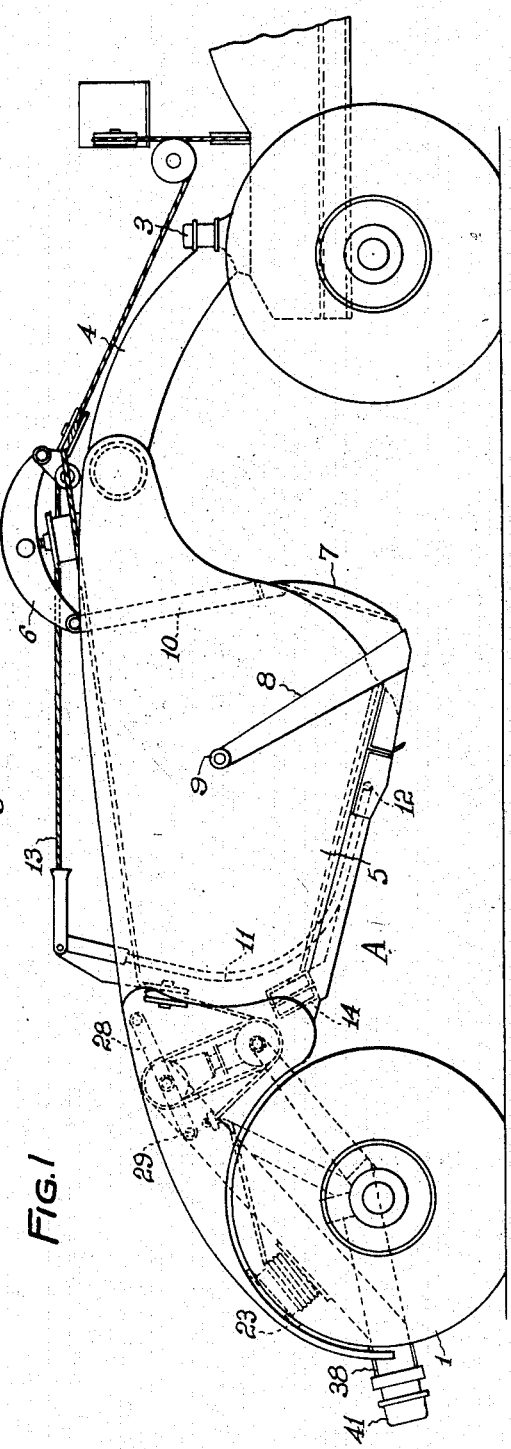
Figure 2 is a side elevation of the same.

Referring more particularly to Figure 2, the draft member 4 is shown as connected to the tractor, by the means 3, and connected to the main body of the vehicle A near the front thereof. Suitably mounted near the front of the dirt carrying vehicle A is an apron controlling means, generally designated at 6, connected to a front apron blade, said apron being rigidly connected to a pair of arms 8 pivoted at 9 on the spaced sides 5 of the vehicle body, through the link means 10.

The operation of the apron and its functions are more fully disclosed in my copending application above identified and are not of consequence herein.

At the rear of the body portion of the vehicle A is the rear apron 11, adapted to be operated on a pivot 12 supported by the lower portions of the sides 5 and from control means mounted on the traction vehicle B, including the cable 13 connected to a drum 33 on the traction vehicle, the aforesaid apron and its function, being more fully described in my copending application. The aprons 7 and 11 function to support the dirt load in the body of the vehicle A and to deposit said load.

At the lower rear portions of the sides 5 of the vehicle, the sides 5 are connected by a cross beam 14 rigidly attached to the sides 5 and forming with the sides and with the scraper unit the main body structure for the vehicle, the same adapted to be raised and lowered in the manner to be hereinafter described.

Figure 4:
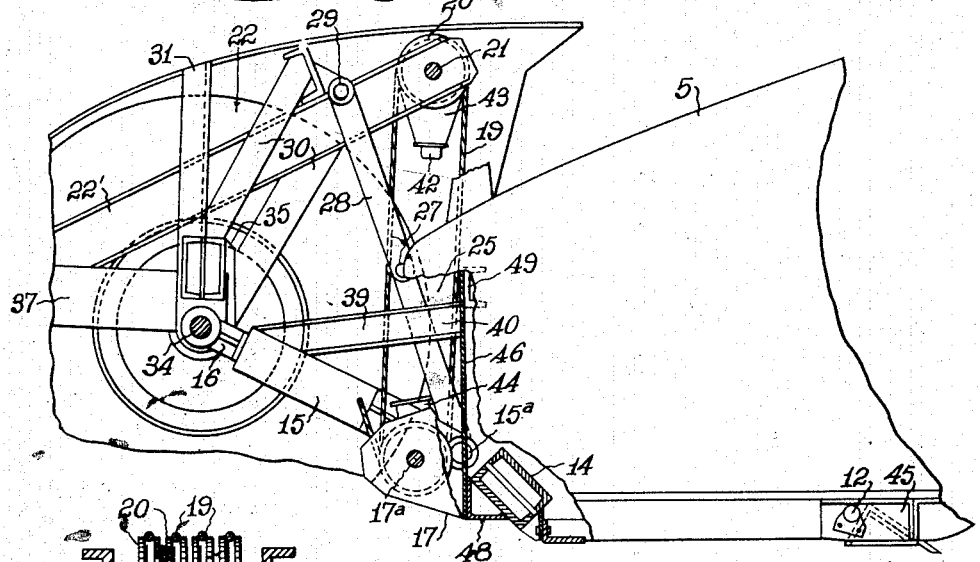
Figure 4 is a view like Figure 3, excepting that the dirt carrying body is in its lowered position in which the scraper operates to cause dirt to enter the body.

The cross beam 14 is connected by lower push frame links 15, best shown in Figure 4, with the rear axle frame assembly of the vehicle, the connection including pivots 15a, at the front ends of the push frame 15, and the pivot connections 16 at the rear ends of the push frame connecting same to the rear axle of the vehicle A.

Connected to a cross plate 46 reinforced by channel 47 and angle 48 secured to the cross beam 14, is a rearwardly projecting bracket 17 carrying multiple sheaves 18 supported at 17a, about which pass the preferably eight or ten part lifting cable means 19, which is reeved about the sheaves 18.

The number of sheaves necessarily involved at this point, depends upon the size and weight of the dirt carrying or hauling body.

The cable 19 is likewise reeved about the multiple sheaves of the multiple sheave block 20 supported at 21 and carried by the upper portions of the rear axle supporting frame, generally designated at 22.

The cable 19 is dead-ended on the frame 22' of the rear axle assembly at a point 24, and extends from the point 24 to reserve cable drum 23.

Extending rearwardly of the cross plate 46, and at right angles to the cross plate, are the plate members 25 and 26 in spaced relation to each other, suitably fastened to the aforesaid cross plate 46 and forming a support at their upper ends for the pivots 27. Links 28 are attached pivotally at 29 to the upper portion of the rear axle frame 22' at its outer end, said rear axle frame comprising rigid members 22'—30 and 31.

Figure 1:
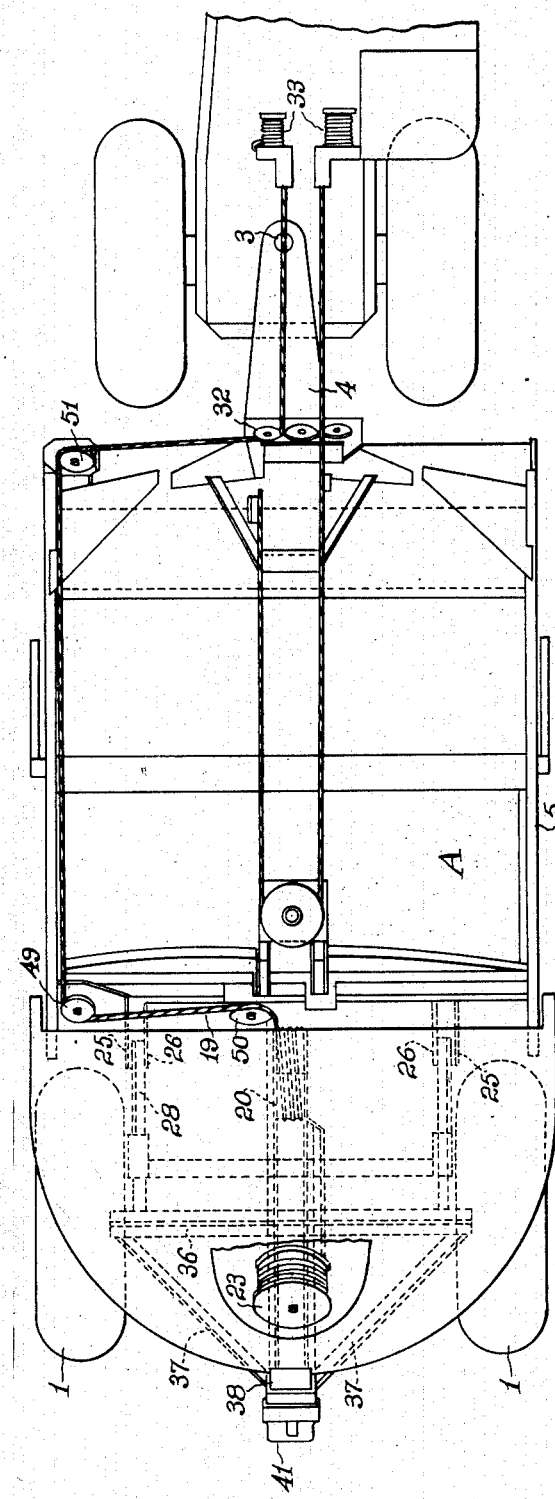
Figure 1 is a top plan view showing a tractor trailer scraper type vehicle unit embodying the invention, the front portion of the tractor broken away.
Figure 3:
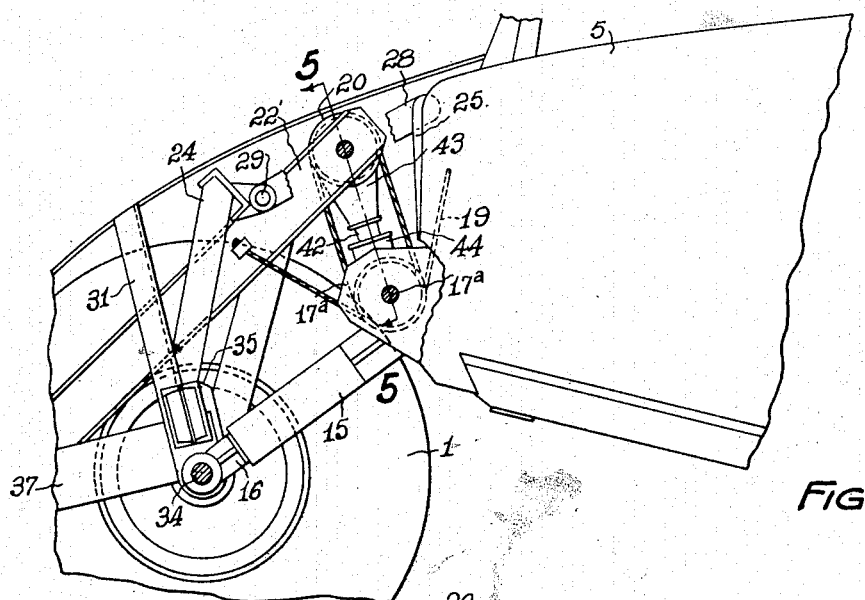
Figure 3 is a fragmentary view of the rear portion of the trailing dirt hauling unit bringing out more clearly the invention as it is applied to the rear wheel frame assembly and the rear portion of the body of the dirt hauling vehicle, the cable means shown as when the dirt carrying body is elevated to its preliminary limit of elevated travelling or spreading movement.

As shown in Figures 1 and 3, the cable 19 leads from the lower sheaves 18 forwardly and upwardly to a point adjacent the top rear portion of the body of the vehicle, over a sheave 50, thence transversely of the rear portion of the body of the vehicle A, in an outward direction, over a sheave 49, thence forwardly between the plates of a side 5 around the sheave 51, thence inwardly to pass over a sheave 32 at the rear end of the draw bar 4, thence forwardly to a winding drum 33 carried by the traction vehicle B, by which the dirt carrying vehicle A is propelled.

By the winding action of the drum 33 pulling forwardly the cable 19, the portions of the cable reeved about the sheaves 18 and 20, will cause the lower rear portion of the body to be lifted, raising the body comprising the rigidly connected parts or sides 5, scraper, aprons, and other similarly connected parts, about an axis at the universal connection 3 of the draft member on the dirt carrying vehicle and the traction vehicle, the extent of raising movement being typified by the showing in Figure 4 with the body lowered and in Figure 3 with the body elevated.

In the lower position of the body, the scraper and dirt receiving action of vehicle A takes place, whilst in the upper position of the body the traveling position of the vehicle has been attained.

It will be seen that upon the raising of the body in the manner described, the push links or frames 15 pivot around the rear axle or axis support 34. Likewise, the links 28 and pivots 27 and 29, connecting the rear portions 25 and 26 of the body with the upper portion of the rear axle frame assembly member 22' of the body A, and the front end of the push links or frames 15, afford a toggle movement during the raising action from the nearly aligned positions thereof in the lowered position of the body as in Figure 4, to the angular positions thereof in the elevated position of the body as typified in Figure 3.

The supporting frame 22 is a substantially rigid supporting structure, having a cross member 35 rigidly connected to the axle 34 near the axle, the central main support 22', on the upper end of which the sheaves 20 are mounted, being supported by the transverse section 36 through the compression members 30 and 31. The lower end of the central supporting member 22' is connected to the transverse section 36 by compression members 37 at 38. The lower end of the supporting member 22' together with the ends of the compression members 37 form a bumper 38 to which the pusher plate of a pushing tractor in the rear of the vehicle A may be applied.

The pushing force from the pushing tractor, not shown, may be transmitted directly through the compression members 37 and pusher links 15. In addition, the pusher frames 15 are provided with rigid supporting members 39 for engaging with the upper rear edge of the scraper body as at 40, when the scraper body is in its lowered position, as shown in Figure 4, the members 39 thereby serving as additional support for the scraper body in this position and operating to prevent the rear axle structure and wheels from being raised off the ground when a pushing force is applied on the bumper 41.

In the raising and lowering movements of the dirt hauling body, the rear portion 46 of the said dirt hauling body, connecting links 28, pushing links 15 and supporting frame 22, together with the pivotal connections 15a—16—27 and 29, form an articulated structure in the nature of a parallelogram which operates in a manner to provide maximum clearance for the dirt hauling body in its raised position.

In the lowered position of the dirt hauling body, as shown in Figure 4, the pivots 15a—27 and 29 occupy a substantially aligned position. As the cable 19 is operated to impart a raising movement to the dirt hauling body, the pivots 18 and 27 are moved upwardly to the position shown in Figure 3. This action results in a drawing of the wheels 1 inwardly toward the scraper body and a slight tilting movement of the supporting frame 22 about the axle 34 in a counterclockwise direction.

Accordingly, it will be noted that the tilting movement of the supporting frame 22 will be transmitted through the cable 19 to give an additional lift to the dirt hauling body, as the cable sheaves 20, being mounted on the rear supporting frame 22' move with the frame, and thereby through the cable reeved about the lower sheaves 18, lift the rear of the said body A.

The primary feature of this invention resides in provisions to prevent the raising of the steering wheels of the tractor vehicle off the ground, because the cable and cable controlled mechanism by which the body of the dirt carrying vehicle is raised, tend to hold the tractor and the dirt carrying vehicle in a substantially rigid condition with respect to each other, when the aforesaid vehicle and tractor are traveling over the ground and when spreading dirt. At the same time, proper tension on the body lifting cable which maintains the dirt carrying body of the dirt carrying vehicle in a raised position with respect to the ground over which the dirt carrying vehicle is travelling, is provided.

Further and more specifically, this invention provides a resilient bumper or stop on a limiting block and a limiting block cooperating with the cable means for engagement with said bumper or stop, said resilient limiting means being interposed between the lifting cable sheaves carried by the body of the dirt carrying or hauling vehicle and the main supporting frame of the rear wheel assembly of the dirt carrying vehicle. The cushion stop means enables the cable to be moved in a greater relative amount than the actual compression of the resilient member in view of the fact that the movement of the cable around the sheave blocks and to the winch, mounted on the tractor, is proportional to the number of lines of cable. For example, if twelve lines of cable around the sheaves blocks are actuated to move the blocks together one inch, twelve inches of cable would then be paid out.

Referring to the drawings, Figure 4 shows the lower limit or stop block 44 mounted on the rearwardly projecting bracket 17 and suitably fastened thereto, and the upper resilient stop block carrying member 43 mounted on the main support frame member 22' in their separated relation.

Figure 3 discloses the above mentioned lower limit or stop block 44 and the upper resilient block and resilient member, in contact.

Figure 5 shows the position of the sheave blocks after the cable 19 has been actuated and through turning on the sheave blocks 18 and 20 to raise the body of the dirt carrying vehicle, and forms a resilient limit to the upper movement of the body.

Figure 5 shows the lower limit stop or block as being a substantially U-shaped member generally designated as 44, the plates or spacers 44a between the sheave pulleys suitably fastened to the connecting portion 44b between the arms 44c, under which the sheaves 18 are rotated on the shaft 17a, the cable 19 being reeved about the sheaves, and passing outside the limit block 44. The limit block is suitably fastened to the lower rear of the body A on the rearwardly projecting brackets 17, as shown in Figure 4. The upper limit block or stop is also a substantially U-shaped member, generally designated as 43, the plates or spaces 43a between the sheave pulleys, suitably fastened to the connecting portion 43b between the arms 43c of which, the sheaves 20 are rotated on the shaft 21. The cable 19 likewise passes outside of the limit block, as best shown in Figure 3. The upper limit block or stop 43 is suitably rigidly fastened on the main rear support frame member 22'. Figure 5 shows the resilient bumper means 42, which is mounted on the lower surface of the limit block 43 and fastened thereto.

The limit block 44 and limit block 43, on which is mounted the resilient means 42, are so positioned on their respective members 17 and 22' that they will of necessity engage one another at some point in the upward movement of the sheaves 18, and their flat surfaces would come together in a parallel relation except for the intervention of the resilient bumper means 42.

The operation of the cable in coaction with the sheaves and limiting means will be readily understood from the following description of the operation of these means in combination with the tractor and dirt carrying vehicle.

When the cable 19 is actuated to raise the body A of the dirt carrying vehicle, through the winding of said cable 19 about the winch 33 mounted at the rear of the tractor vehicle, the cable 19 is moved about the lower sheaves 18 mounted at the lower rear portion of the dirt hauling vehicle body on the shaft carried by the rear lower portion of the dirt carrying vehicle at 17a and the sheaves 20 mounted at the upper end of the main rear frame support member 22', on the pivot 21 on the frame, causing the rear of the body to be raised and thus bring the lower limit or stop block 44 into contact with the upper resilient stop means 42 mounted on the U-shaped bracket 43. At this point, the dirt hauling body A having been raised to its traveling or dirt spreading position, as shown in Figure 2, the cable 19 is maintained in its tensioned position and supports the rear of the dirt hauling vehicle body and its load therein. When the front or steering wheels of the tractor B go into a depression or rut in the terrain, a strain is imparted to the cable 19 through the leverage of the tractor B around the pivot or universal joint 3 on the tractor.

It will be seen from the above that if further movement of the cable about the sheaves 18 and 20 was not permitted, the steering wheels of the tractor B would be kept out of contact with the ground and loss of control of direction of said tractor would result. However, this invention permits the sheaves 18 and 20 to approach nearer or closer together through the compression of the resilient limiting means or stop 42 against the lower limit block 44, and allow the cable 19 to be moved around the sheaves 18 and 20 and thus be paid out to the winch 32, in turn permitting the steering wheels of the tractor to remain in contact with the ground. Further movement of the cable 19 about the sheaves 18 and 20 will further compress the resilient portion 42 of the limit block 43 and allow more cable to be paid out.

It will be readily understood that if the rear wheels of the traction vehicle shall be forced to go over a bump or rock, or if the rear wheels of the dirt hauling vehicle shall ride into a depression or hollow, the aforesaid action of compression of the resilient limiting means 42 will also take place. It follows, therefore, that when the wheels of the vehicle both those of the tractor and those of the dirt hauling vehicle, have again reached a substantially normal plane of movement, the resilient limiting means 42 will expand, thus separating the sheave blocks 18 and 20, and maintain the constant desired tension on the cable 19, and through the cable, support the dirt hauling vehicle body A during its course of traveling or dirt spreading action.

Having thus described my invention, what I claim as new and desire to secure by Letters Patent of the United States, is:

1. In a tractor trailer dirt hauling vehicle unit, in combination, a tractor comprising front steering wheels and rear supporting traction wheels, a dirt hauling vehicle comprising a dirt carrying body, rear wheels for said body, a rear wheel supporting frame assembly movably connected with the rear end of the dirt carrying body, cable means connected with the tractor vehicle and operable therefrom to raise and lower the body, connecting means between the cable means and the rear portion of the body and the movable frame assembly of the rear wheels of the body for effecting relative movement of these parts for the raising and lowering of the body relatively to the rear wheels, and resilient limiting means intermediate said rear frame assembly of the rear wheels and the rear portion of the body to enable movement of the cable independently of its operation from the tractor when said limiting means is effective for controlling the extent of elevating movement of the body relatively to its rear wheels.

2. A tractor trailer dirt hauling vehicle unit as claimed in claim 1, wherein the resilient limiting means comprises a limiting stop member carried by one of the vehicle body or rear wheel frame assembly parts, and a cooperating resilient stop member is carried by the other of said parts.

3. A tractor trailer dirt hauling vehicle unit as claimed in claim 1, combined with sheaves for the cable means, certain of said sheaves being mounted upon the rear portion of the body for cooperation with the cable means and other of the sheaves being mounted upon the rear wheel frame assembly for said body for cooperation with the cable means, the cable means being reeved about said two sets of sheaves and extended forwardly to the tractor for connection with the operating means thereon, the resilient limiting means including a stop member adjacent to and movable with the sheave means on the body, and a cooperating resilient stop member carried on the frame assembly of the rear wheels of the body and adjacent to the sheaves of the latter.

4. A tractor trailer dirt hauling vehicle unit as claimed in claim 1, combined with sheaves for the cable means, certain of said sheaves being mounted upon the rear portion of the body for cooperation with the cable means and other of the sheaves being mounted upon the rear wheel frame assembly for said body for cooperation with the cable means, the cable means being reeved about said two sets of sheaves and extended forwardly to the tractor for connection with the operating means thereon, the resilient limiting means including a stop member adjacent to and movable with the sheave means on the body, and a cooperating resilient stop member carried on the frame assembly of the rear wheels of the body and adjacent to the sheaves of the latter, said resilient limiting means as above described being arranged so as to move with the sheave means adjacent to which they are disposed in substantially the line of movement of the separate sets of sheaves as they are shifted toward and from each other by the controlling operation of the cable means at the tractor.

5. In a tractor trailer vehicle unit of the class described, comprising, a four wheel tractor with front steering wheels and a dirt hauling vehicle connected to the tractor vehicle and movable vertically and laterally relatively thereto, said trailer vehicle including rear supporting wheels and a rear wheel frame assembly movably connected to the body to articulate in reference thereto, cable means operable from the tractor and leading rearwardly therefrom to the trailer dirt carrying vehicle and having connection with the rear portion of the dirt carrying vehicle body and with the upper portion of the rear wheel assembly frame so that by operating of the cable means the assembly frame and body may be articulated to raise and lower the body relatively to the ground, and resilient limiting means intermediate the body and the rear wheel assembly frame for enabling movement of the cable means after the body has been elevated to cause cooperative action of the resilient cable limiting means to initially limit the extent of elevation of the body.

6. Means as set forth in claim 5, wherein the rear wheel frame assembly carries a plurality of sheaves and the rear portion of the body carries a plurality of sheaves about which sheaves the cable means is reeved to provide a multi-part line cable and sheave assembly, the resilient limiting means including a stop associated with the set of plural sheaves carried by the body, and a cooperating resilient bumper stop associated with and carried by the rear wheel assembly frame adjacent to the plural sheaves upon the latter, the said stop and bumper stop parts being disposed to travel in the line of relative movement of the sets of sheaves upon the body and the rear wheel frame assembly.

GEORGE A. VAUGHN.